March 28, 1939.　　G. W. CRABTREE　　2,152,030
SPRING COVER
Filed March 31, 1936　　3 Sheets-Sheet 1
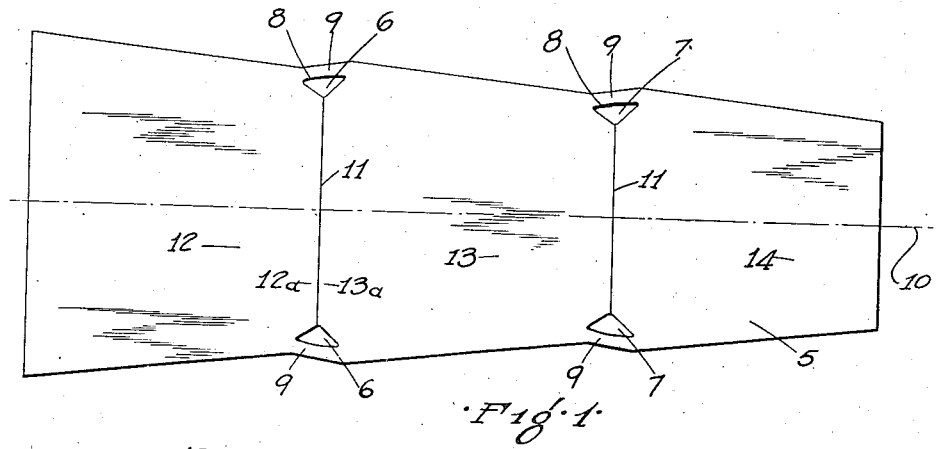
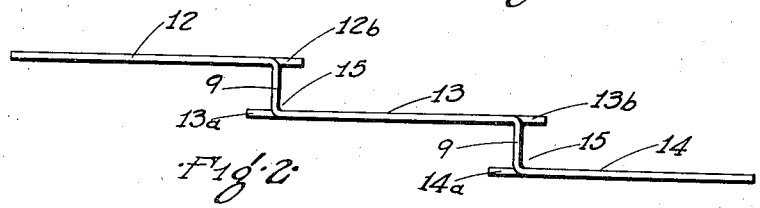
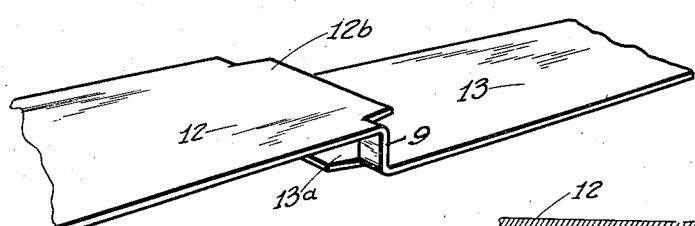
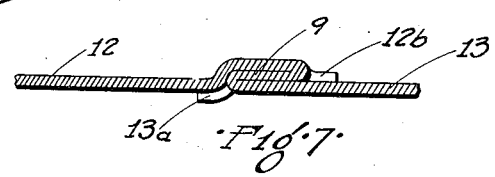
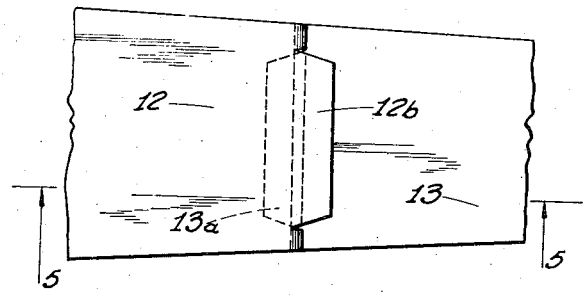
Inventor
GEORGE W. CRABTREE
Richey & Watts
Attorneys March 28, 1939.　　　G. W. CRABTREE　　　2,152,030
SPRING COVER
Filed March 31, 1936　　　3 Sheets-Sheet 2
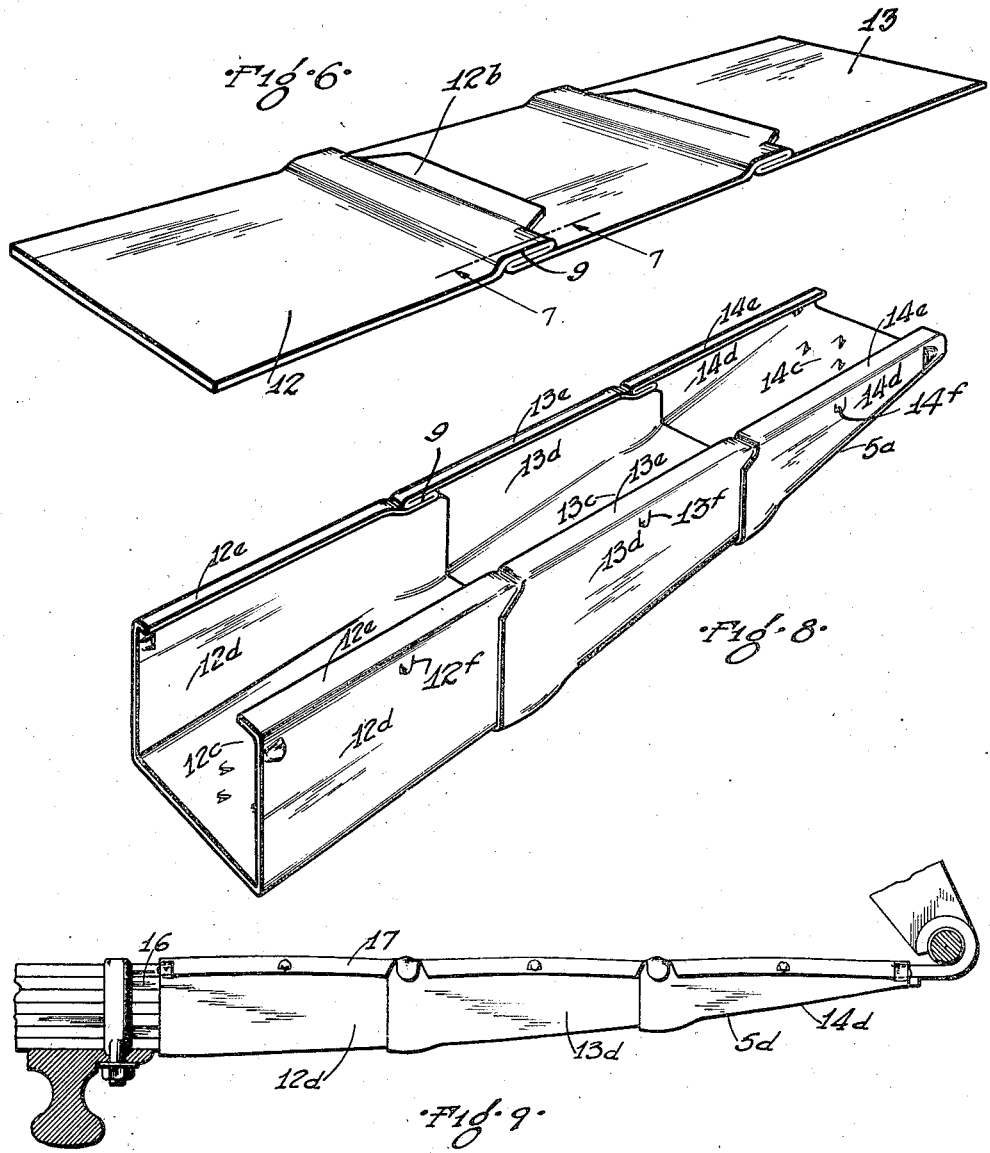
Inventor
GEORGE W. CRABTREE
By Richey & Watts
Attorneys March 28, 1939. G. W. CRABTREE 2,152,030
SPRING COVER
Filed March 31, 1936 3 Sheets-Sheet 3
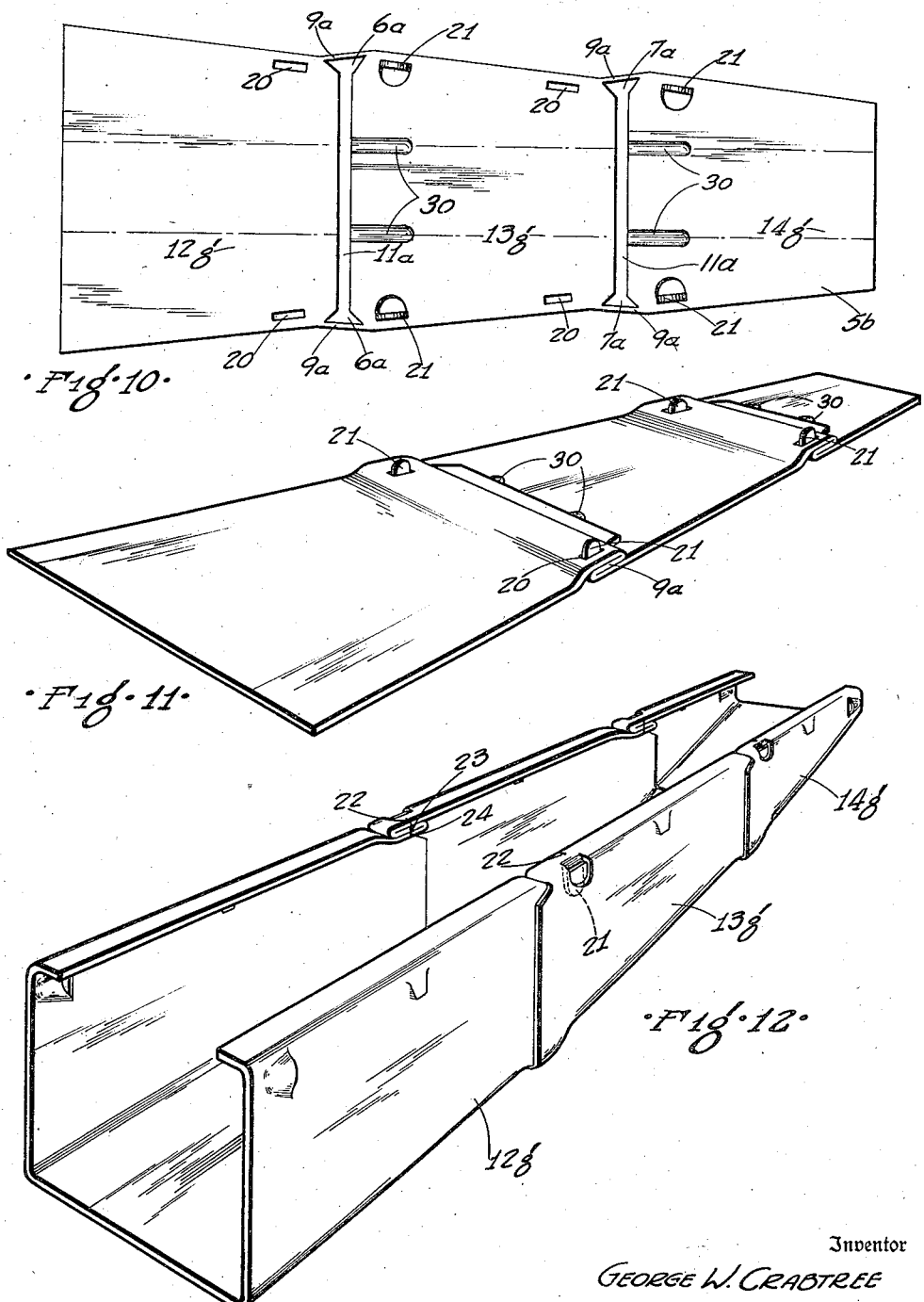
Inventor
GEORGE W. CRABTREE
By Richey & Watts
Attorneys Patented Mar. 28, 1939

2,152,030

UNITED STATES PATENT OFFICE 2,152,030

SPRING COVER

George W. Crabtree, Cleveland Heights, Ohio

Application March 31, 1936, Serial No. 71,890

4 Claims. (Cl. 267—37)

This invention relates to spring covers for motor vehicle springs and more particularly to a cover and method of making a cover by stamping the body of same from one piece of metal.

It is among the objects of my invention to provide a spring cover having a one-piece body or box section which will flex intermediate its length in response to spring movement. It is a further object of my invention to provide a spring cover having a U-shaped body or box section formed of interconnected parts adapted to flex with respect to each other and accommodate spring deformation. It is a further object of my invention to provide a spring cover and method of forming same wherein a unitary blank may be cut and folded intermediate its length to provide box or body sections which will flex with respect to each other and wherein the flexible relation between the parts may be maintained by retaining an integral connection between the sections or by severing such integral connection and using a separate section connecting means. It is a further object of my invention to provide a method of forming spring covers which will require the use of but two blanks so shaped and proportioned and folded that they will completely enclose a laminated leaf spring, will flex in response to spring flexure and will effectively lubricate and protect the spring under all conditions. It is a further object of my invention to provide a method of forming a flexible body section for a spring cover by cutting a wedge shaped blank transversely of the length of the blank and intermediate the longitudinal edges thereof to define a plurality of sections which are integrally connected with each other along their marginal edges and thereafter overlapping said sections adjacent said transverse cuts and folding the overlapped blank to encompass a spring. Further objects and advantages relating to simplicity in construction and economies of manufacture will appear from the following description and the appended drawings wherein:

Figure 1 is a plan view of a metallic blank proportioned to form the body section of the spring cover;

Figure 2 is an elevation of the blank of Figure 1 subsequent to cutting the same transversely and offsetting the sections defined by cutting;

Figure 3 is a perspective view of a portion of the blank of Figure 2;

Figure 4 is a plan view of the blank corresponding to the showing of Figure 3;

Figure 5 is an enlarged sectional view taken along the lines 5—5 of Figure 4;

Figure 6 is a perspective view illustrating a further step in the formation of the one-piece body section;

Figure 7 is an enlarged sectional view taken along the line 7—7 of Figure 6;

Figure 8 is a perspective view illustrating a further step in the formation of the spring cover;

Figure 9 is an elevation showing the body section illustrated in Figures 1 to 8 as assembled with a top section about the vehicle spring;

Figure 10 is a plan view of a blank employed in a modified form of my invention;

Figure 11 is a plan view of the modified form subsequent to the first forming step;

Figure 12 is a perspective view in finished form of the modification as made from the blank of Figure 10.

Generally speaking, I have attained the objects outlined above by stamping out a sheet metal blank tapered throughout its length so that it will enclose three sides of a laminated vehicle spring when the blank is folded to give it a substantially U-shaped cross section. The necessary flexibility of the sections formed from this blank, which will for convenience be referred to as the body or box section, results from a novel method of cutting the blank transversely of its length at intervals throughout and folding the blank to form an overlap adjacent said cuts. The transverse cuts terminate short of the marginal edges of the blank and serve to interconnect the sections defined by the cuts and in this way eliminates the necessity for riveting or analogous forms of pivotal connection between the sections.

Preferably the wedge shaped blank indicated generally at 5 is pierced as at 6 and 7 during the blanking out of the form 5. The apertures formed by the piercing are generally triangular in shape and the edge of the triangle more nearly adjacent the marginal edges of the blank 5 are curved as indicated at 8 to provide a resilient web 9 which ultimately becomes the sole connection between the relatively movable portions of the box section. The longitudinal center line of the blank 5 is indicated at 10 and on lines 11 normal to the center line and extending to the adjacent apexes of the opposed triangles the blank 5 is severed so as to define a plurality of sections 12, 13 and 14.

During the transverse cutting of the blank along the lines 11 the sections 12, 13 and 14 are preferably offset with respect to each other by depressing the section 13 with respect to the section 12 and depressing the section 14 with respect to the section 13 (see Figure 2). By swinging said last named sections with respect to each other on the arcs indicated by arrows 15 the tongue 12b of section 12 is arranged to overhang the section 13 and the tongue 13a of section 13 may be arranged beneath the section 12. Tongues 13b and 14a are similarly disposed with respect to sections 13 and 14 (see Figures 3 and 4). By continuing the forward or overlapping movement of the sections with respect to each other as indicated by the arrow 16 (Figure 5) the sections are flattened or forced into substantially one plane as indicated in the perspective view of Figure 6. Through this overlapping and flattening movement of the adjacent sections the marginal web 9 is enclosed between parallel wall portions of connected sections and the rearwardly extending tongue 13a and the forwardly extending tongue 12b project beyond the overlapped portions of the sections.

Following the overlapping of the adjacent sections comprising the blank 5 the blank is fed into a forming die which brings up the side portions and turns the marginal edges thereof inwardly to form a substantially U-shaped body section indicated generally as at 5a. As thus contoured the section 12 results in the box-like section having a bottom wall 12c, side walls 12d and inwardly turned flanges 12e at the upper free edges thereof. Similarly the sections 13 and 14 produce box-like sections having like parts indicated with like exponents c to e inclusive. The inturned flange 12e corresponds in width to the widest part of the connecting web 9 and thus the box sections formed from 12, 13 and 14 are integrally connected with each other only through the medium of the web 9 which through said folding operations is positioned in the plane of the leaves of the laminated spring which the cover is designed to enclose. During the folding of the sections into their box-like form the overlapped portions of the bottom wall parts 12c—13c—14c are forced by co-operating die portions to acquire a rounded or circular contour, the radius of which corresponds substantially to the depth of the box section at the overlapped portions. In this respect my one-piece spring cover box section corresponds in structure and in function to that disclosed in my copending application Serial No. 9,097, filed March 2, 1935, now Patent No. 2,099,197, November 16, 1937. The side walls 12d—13d—14d are also suitably cut and pressed during the box forming operation to provide latching devices 12f, 13f, 14f and the like to co-operate with a one-piece spring cover top section 17 preferably constructed and arranged according to my copending application Serial No. 71,889, filed March 31, 1936, now Patent No. 2,095,859, October 12, 1937. In this connection, however, it is pointed out that the box section formed of one-piece blank slotted and overlapped as herein described is suited for use with other types of top or cover sections and in the event that other forms of cover or top are employed the latching devices 12f—13f—14f and the like may be replaced by latching means arranged to co-operate with the particular type of cover employed.

The body section 5a is preferably lined with a fabric grease retaining wrapper such as disclosed and claimed in my copending application Serial No. 71,891, filed March 31, 1936. The wrapper may be secured in the cover section by prongs struck out adjacent the ends of the box section as disclosed in said copending application Serial No. 71,889, filed March 31, 1936. The cover section indicated as at 17 may be applied and latched in position as best described in said last mentioned copending application and the cover as thus arranged upon the spring will flex freely in response to spring movements. The U-shaped sections formed from blank sections 12, 13, 14 move freely with respect to each other through their arcuate overlapped portions and the web 9 which holds said sections together functions generally as a hinge or pivot between adjacent sections. It will be understood, however, that there is no centralized area or point of flexure in the web 9 but that the same may flex more or less throughout its length depending upon the nature of the bending stress or forces acting to move one section with respect to the other. The result is a relatively flexible interlocking connection between the overlapped sections which effectively seals the overlapped parts against the entrance of water or foreign material and which provides a spring cover which is silent or non-rattling throughout all conditions of use.

Since the forward ends of the connecting web 9 as secured to the sections 12 and 14 respectively should be aligned with the marginal edges after the overlapping operation, the rear ends of the blank sections 13 and 14 are each proportioned to be wider where joined to the web 9 than where the triangular piercing is effected. This proportioning of the initial blank 5 results in a straight edged continuous flange 12e—13e—14e (see Figure 8). As will be understood from the foregoing description of the method of stamping out, folding and assembling my spring cover the one-piece or unitary box section eliminates the need for rivets or other supplemental types of connecting devices and eliminates a number of expensive time consuming manual operations occasioned by assembling and riveting box sections together.

Sheet material heretofore wasted by many of the prior art methods of making spring covers is thus utilized and its utilization results in a more satisfactory connection between the sections of the spring cover body. The method is well suited to automatic machinery of known types wherein follower dies effect the overlapping of sections 12, 13 and 14. The method, for instance, may be carried out by a blanking and piercing operation in one die, a shearing and off-setting operation in a second set of dies, a flattening or overlapping in a third set of dies and a longitudinal folding and rounding of the overlapped portions in a fourth set of dies. The only manual operations occasioned by this method of manufacture is that of feeding the blanks into the dies. During the piercing operation it is not essential that the apertures 6 and 7 be contoured or proportioned exactly as shown, but I have found that this type of aperture chamfers the corners of the overlapped tongues 12b and 13b and thus permits free flexing of the finished unit. The curvature along the side 8 of the triangles also makes the web 9 more resilient intermediate its ends and thereby insures that the bending action will not be centralized.

To take advantage of the ease of assembly associated with the one-piece construction above described and yet provide a spring cover without integral connections between the sections I have provided the modification illustrated in Figures 10 to 12. In this form of my invention a wedge shaped blank identified generally as at 5b is stamped out somewhat as the form shown in Figure 1 except that in the modified form the triangular apertures 6a and 7a are connected to each other by a relatively wide transverse slot as at 11a. A further distinguishing feature of the form illustrated in Figures 10 to 12 is a change of proportion in the web 9a. The web 9a is proportioned to have a width corresponding to about one-half the width of the inturned flange in the finished article. Since the modified form of my invention contemplates the use of a separate device for pivotally securing the sections of the body of the cover together, co-operating tongue and slot members 20 and 21 are formed in the blank at each side of the triangular apertures 6a. During the stamping out of the blank the tongue 21 is forced upwardly from the plane of the blank and following the stamping out process the section 12g is overlapped to be positioned upon the section 13g with said tongues projecting upwardly through the slots of the section 12g. It will be observed that the distance from the edge of the slot and the edge of the tongue is substantially twice the width of the web 9a.

Subsequent to the overlapping of sections 12g, 13g, 14g, the blank is formed or shaped to embrace the spring substantially as in the embodiment first described and during this forming the inturned flange at the free edge of the sections is cut at about the center of its overlapped portions. This cut severs the metal along the lines 22, 23 and 24, the cut at 23 completely separating one section from the other by reason of the complete severance of the web 9a. It will be observed that the cuts 22 and 24 may have sufficient metal surrounding the apertures 20 and tongues 21 to permit them to accomplish the function for which they are designed. The tongue 21 being integral with the flange formed at the free edge of the sections and normally projecting upwardly from the plane of the section (see Figure 11), assumes a position substantially parallel with the inner wall of section 12a and section 13a when the inturned flange is formed.

During the stamping out operations the blank 5b is preferably provided with depressions 30 (Figure 10), which depressions stretch or draw in the metal in those portions which form the outer overlap. It will be understood by those skilled in the art that when sections such as 12g, 13g and 14g are overlapped and then bent into a U-shaped body the outer section at the overlap must of necessity form a slightly larger U than the inner section at the overlap. To accommodate the creeping or shifting of the metal during the U-shaping of the blanks, the depressions 30 are formed substantially at the fold line in the stamped out sheet. Referring again to Figures 10 and 11, the forward section of 12g is disposed upon the rearward end of 13g, and the forward end of 13g in the same manner is arranged upon the rearward end of 14g. When the sections as thus arranged to form the overlap at the joint are bent to U form, the surplus metal provided at the fold line by the depressions 30 is reformed to become a part of the side wall at the overlap, and the depressions as such disappear and cannot be detected in the finished article. An alternative method of obtaining a like result would be to slot the forward ends of 12g and 13g at the overlap and thus permit a reduction in size of the U formed by the section 12g at the overlap. It will be observed that the forming of depressions such as 30 at the rearward ends of the overlapped sections, constitutes a step in the method of forming spring covers which is not restricted to the one piece type of construction, but is a step which is suited to various types of metallic spring covers having overlapped sections.

Since the sections are completely separable and secured to each other only through the medium of the tongue and slot device 20—21 they are free to pivot through this device in response to flexing of the spring. The lower walls of the body section are rounded at the overlapping portions as in the embodiment illustrated in Figures 1 to 9 and when assembled upon the spring the body section is designed to receive a cap or top in the usual manner. It will be observed that the spring cover formed according to Figures 10 to 12 has all of the advantages with respect to assembly which flow from the one-piece construction and as a matter of fact comprises a one-piece body prior to the final forming step which severs the web 9a. The tongue and slot connection which serves as a pivot between the sections in the finished article co-operates with the web 9 to hold the sections in place during the forming of the cover and the said tongue and slot connection eliminates the need for rivets or the like and thus results in a cover economical in manufacture.

While I have shown and described two embodiments of my invention in considerable detail I appreciate that various changes or modifications therein may be effected by those skilled in the art without departing from the scope of the invention as defined by the claims.

I claim:

1. A spring cover body comprising a series of interconnected sections having a bottom wall, opposed side walls and laterally extending flanges integrally formed on the free edges of said side walls, said sections being formed with overlapping free ended portions in said bottom and side walls and connected to each other through overlapped integral portions of the laterally extended flanges and by interfitting tongues and apertures formed respectively in adjacent sections and arranged to permit flexing of the cover in response to flexure of the spring embraced by the cover.

2. A spring cover body comprising a series of interconnected sections having a bottom wall, opposed side walls and laterally extending flanges integrally formed on the free edges of said side walls, said sections having free ended overlapped portions in their bottom and side walls, said sections being connected to each other in said overlapped relation through a folded over portion of said laterally extending flanges, said free ended overlapped portions of the bottom being rounded to permit flexing of the cover in response to flexure of the spring embraced by the cover.

3. A spring cover body comprising a series of sections having a generally U-shaped cross section, a laterally extending flange formed at the top edge of the side walls, said laterally extending flange being continuously integral throughout the axial extent of the spring cover body and being overlapped to provide three thicknesses of material at the junction between the sections, the side walls and bottom of said sections having free ends disposed in overlapped relation.

4. A spring cover body comprising a series of U-shaped sections, a laterally extending flange formed at the marginal edge of the side walls, said laterally extending flange being continuously integral throughout the axial extent of the spring cover body, said flange being overlapped to provide three thicknesses of material at the junction between the sections, the bottom and portions of the side walls having free ends disposed in overlapped relation and providing two thicknesses of material throughout the remainder of the junction between the sections.

GEORGE W. CRABTREE.